(12) United States Patent
Grady

(10) Patent No.: US 8,661,666 B2
(45) Date of Patent: Mar. 4, 2014

(54) METHODS OF INSTALLING WIRING IN POURED CONCRETE

(76) Inventor: John K. Grady, Harvard, MA (US)

(*) Notice: Subject to any disclaimer, the term of this patent is extended or adjusted under 35 U.S.C. 154(b) by 713 days.

(21) Appl. No.: 12/899,769

(22) Filed: Oct. 7, 2010

(65) Prior Publication Data

US 2012/0084972 A1   Apr. 12, 2012

(51) Int. Cl.
*H01R 43/00* (2006.01)

(52) U.S. Cl.
USPC ............... 29/868; 29/830; 174/486; 220/304

(58) Field of Classification Search
USPC .................. 29/825, 830, 857, 858, 868, 869;
52/220.1, 220.3; 174/58, 63, 482, 486;
220/3.3, 3.4, 3.6, 3.8, 4.02; 248/906;
439/535
See application file for complete search history.

(56) References Cited

U.S. PATENT DOCUMENTS

| | | | | |
|---|---|---|---|---|
| 2,038,291 A | * | 4/1936 | Hooley | 220/3.4 |
| 5,257,487 A | * | 11/1993 | Bantz et al. | 52/220.3 |
| 5,467,565 A | * | 11/1995 | Bowman et al. | 52/220.1 |
| 6,979,779 B2 | * | 12/2005 | Grady | 174/58 |

* cited by examiner

*Primary Examiner* — Donghai D Nguyen
(74) *Attorney, Agent, or Firm* — Donald S. Holland, Esq.; Holland & Bonzagni, P.C.

(57) ABSTRACT

Applicant has disclosed an improved method and apparatus for installing electrical junction boxes in embedded concrete construction applications. In the preferred embodiment, a first box (with at least one attached conduit) is embedded in the bottom of a concrete deck at pour, wherein the box has an open bottom covered during the pour. After pouring, the cover is removed to expose the open bottom, through a plane of the deck, without having to break through the concrete. A second box, with an open top, is lifted up and fastened (preferably, screwed) to the embedded first box to complete a preferred electrical junction box. The second box is designed to be exposed to accept surface mount or exposed wiring methods. There is a passage between the first and second boxes for accepting wire pulled through the conduit(s).

9 Claims, 7 Drawing Sheets

METHODS OF INSTALLING WIRING IN POURED CONCRETE

FIELD OF THE INVENTION

The present invention relates generally to electrical junction boxes, also known as outlet boxes. More particularly, it deals with electrical junction boxes used in embedded concrete applications, such as concrete decks.

BACKGROUND OF THE INVENTION

In wiring concrete decks, a frequent problem is that the pipe or conduit carrying many wires to a central point (e.g., power panel closet, fire alarm box, or center of an office or hotel room) must exit the poured concrete slab into the utilization room below the poured concrete deck. This conduit must be placed on the temporary "form" of metal or plywood that will support the wet concrete until it hardens, and will therefore end up embedded in the concrete slab.

However, the exit end of this conduit (i.e., at a room end) presents a problem, as it cannot be allowed to project out of the bottom plane (i.e., the bottom surface) of the form support deck; if it did, it means a custom hole in the support deck that must be carefully sealed to avoid a concrete leak. This is rarely done except when required, by exceptional circumstances, as much hand-work or labor is involved.

Instead, a small outlet box (e.g., preferably 6"×6" or larger) is positioned face down on the deck form; it may be filled with foam, plastic or protected by a plastic cover to keep concrete out.

After the concrete hardens and the support or "form" deck is removed, the box is located in the ceiling from below, and broken into, and the required wires are pulled in. At this point, another box must be fastened over the original one and a large hole cut in this second box on the back surface, usually the same size as the embedded box. This is to provide an entry point for wires emanating from the concrete encased box and its conduits, and to provide termination and end support for pipes and/or cables running exposed on the underside of the new deck. It is not possible to access the sides of the embedded box in the concrete, and the cover where all these wires join must be removable, eliminating any possible cable access through, for example, a plain flat cover.

All of the above parts are now made by hand or modified at the site or shop from known, stock, electrical junction box parts.

The generally square shape of the recessed box opening is not optimal for pulling in wires. A bigger rectangle-like cover or opening as used on an electrical "LB" conduit fitting, (which has the same function of allowing wire pulls) would be much better, and a matching surface box to match that opening can then be attached to it, or over it.

Accordingly, it is a general object of the invention to provide a related method and apparatus for embedding an electrical junction box in concrete applications, such as decking or flooring, which simplifies the prior manufacturing process by eliminating several steps described above.

It is another general object to provide an improved process for obtaining wire pulls with such an electrical junction box.

It is a specific object to provide such an electrical junction box in which at least part of the electrical junction box can be pre-located prior to having concrete poured around the box.

It is a more specific object to provide an electrical junction box, commensurate with the above-listed objects, with two mating parts for use in managing transitions from conduit within concrete decks to cables outside the deck.

SUMMARY OF THE INVENTION

In a preferred embodiment of the invention, a matched two-piece electrical junction box is presented which is optimized for installing wire pulls in embedded concrete construction applications. Both pieces are open-ended boxes, preferably rectangular.

The installation process is described as follows: a first or "upper" box, with an open bottom end facing downward, is embedded (along with at least one connected conduit) in the bottom at pour; a removable cover is temporarily attached (preferably, screwed) to the first box to cover its bottom end, prior to the pour, to prevent concrete from entering during the pour; the cover is removed after the pour to expose the open bottom end without having to break away concrete; and, a second or "lower" box, with a top end having an opening, is then lifted up and fastened (preferably, screwed) to the embedded first box. The second box is designed to be exposed below the deck to accept surface mount or exposed wiring methods. There is a passage between the two joined boxes for accepting conduits.

BRIEF DESCRIPTION OF THE DRAWINGS

The above and other objects will become more readily apparent when the following description is read in conjunction with the accompanying drawings, in which.

DETAILED DESCRIPTION OF THE PREFERRED EMBODIMENTS

Referring to FIGS. 1-12, Applicant has disclosed an improved method and apparatus for installing electrical junction boxes, and running wire though associated conduit(s), in embedded concrete construction applications.

In the preferred "apparatus" embodiment, a two-piece electrical junction box 100 comprises: a first or "upper" box 102, designed to be embedded (along with at least one attached conduit) in the bottom of a concrete deck "at pour" (i.e., during pouring of the deck), with an open end of the upper box facing downwards and temporarily covered at pour; and a second or "lower" box 104, designed to be lifted up, snuggled against, and fastened, to the uncovered embedded box 102. When the two boxes 102, 104 are joined, they form the assembled junction box 100 with lower box 104 exposed below the deck.

Figure 2:
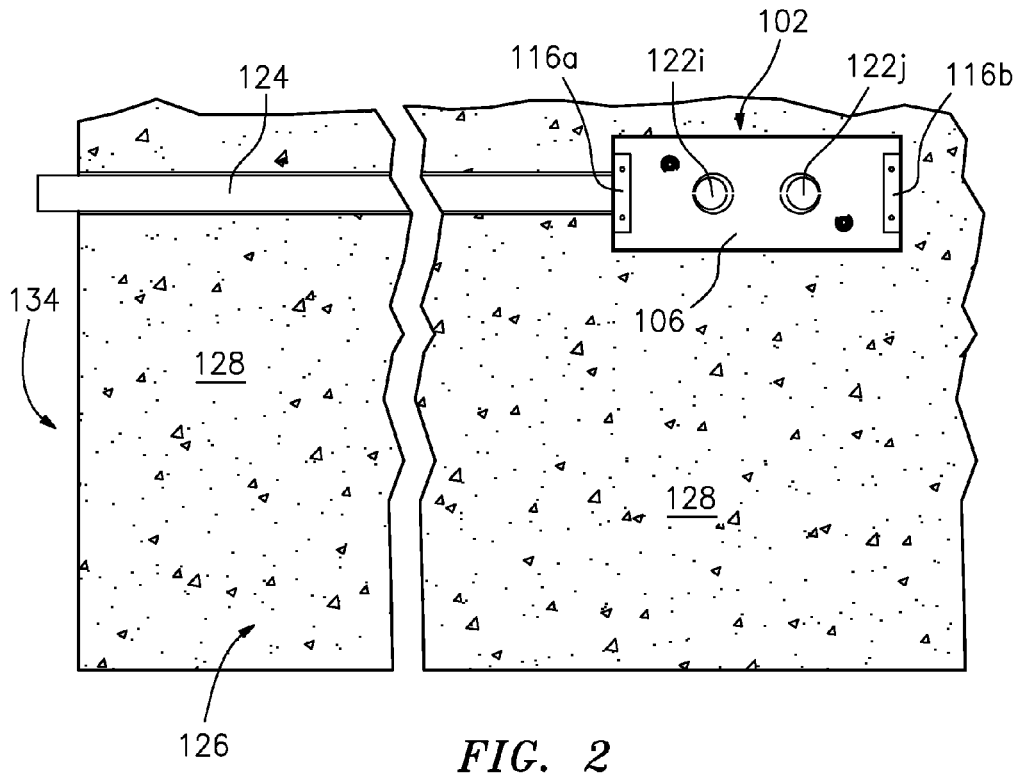
FIG. 2 is a view looking up into the embedded upper box of FIG. 1.
Figure 3:
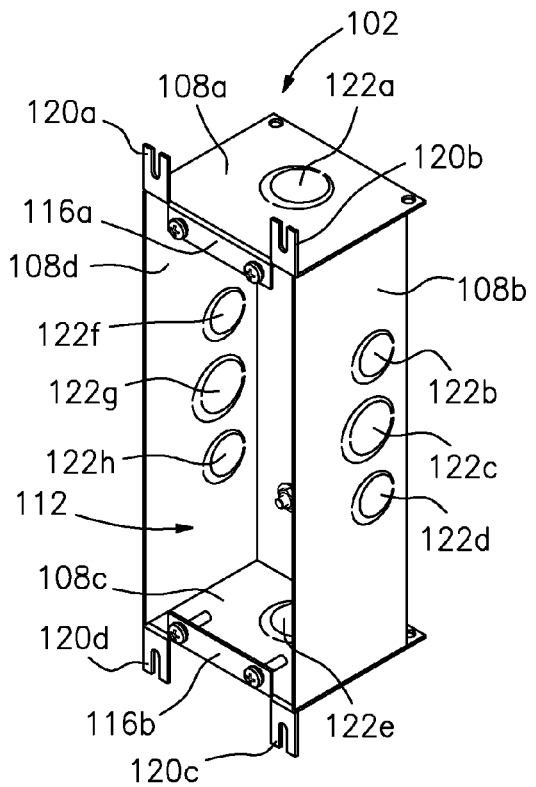
FIG. 3 is a bottom perspective view looking into a non-embedded upper box.
Figure 4:
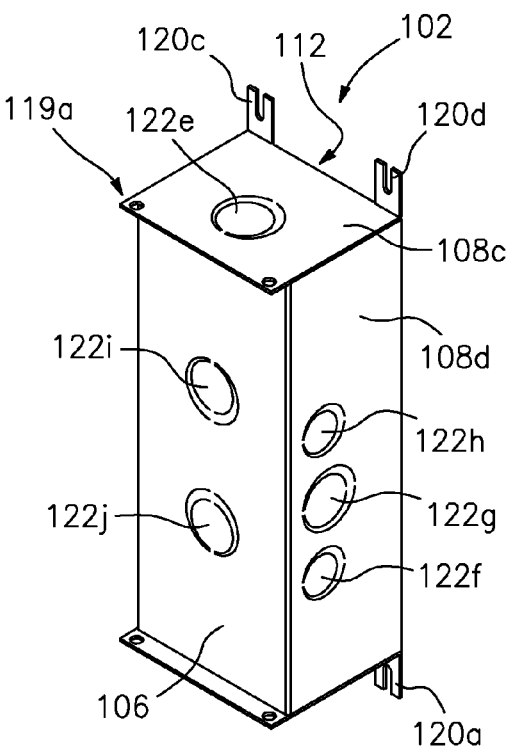
FIG. 4 is a top perspective view of the preferred non-embedded upper box.
Figure 5:
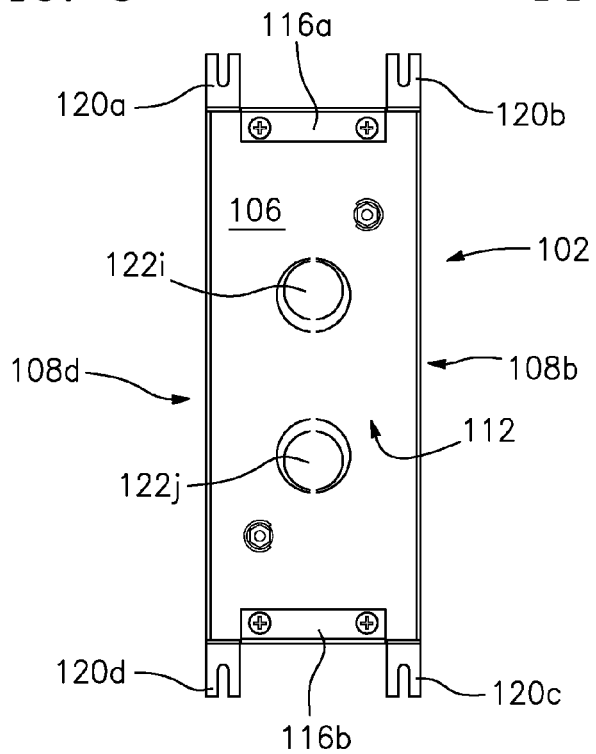
FIG. 5 is a bottom plan view of the non-embedded upper box.

FIGS. 3, 4 best show Applicant's upper box or box 102, designed to be embedded (see FIGS. 1, 2, 9) in concrete. It is preferably a rectangular metal junction box 102. While other dimensions could be used, box 102 is preferably about three times as long as it is wide and about 4" to 6" deep. The box preferably has: a top 106; four sides 108a, 108b, 108c, 108d; an open bottom 112 flanked by two flanges 116a, 116b; and a temporary cover 118 (see FIG. 11), such as a metal plate, preferably screwed into the flanges 116a, 116b. Cover 118 helps keep out the concrete during a pour.

Upper box 102 is equipped with external upper tabs or projections 120a, 120b, 120c, 120d to attach it with tie wires (not shown) or nails (not shown) to typical adjacent parts such as rebar (not shown) or plywood decking (not shown). Sides 108a, 108c extend slightly beyond top 106. Their extensions have corner holes (e.g., 119a) to additionally tie the box to rebar or plywood decking.

Figure 9:
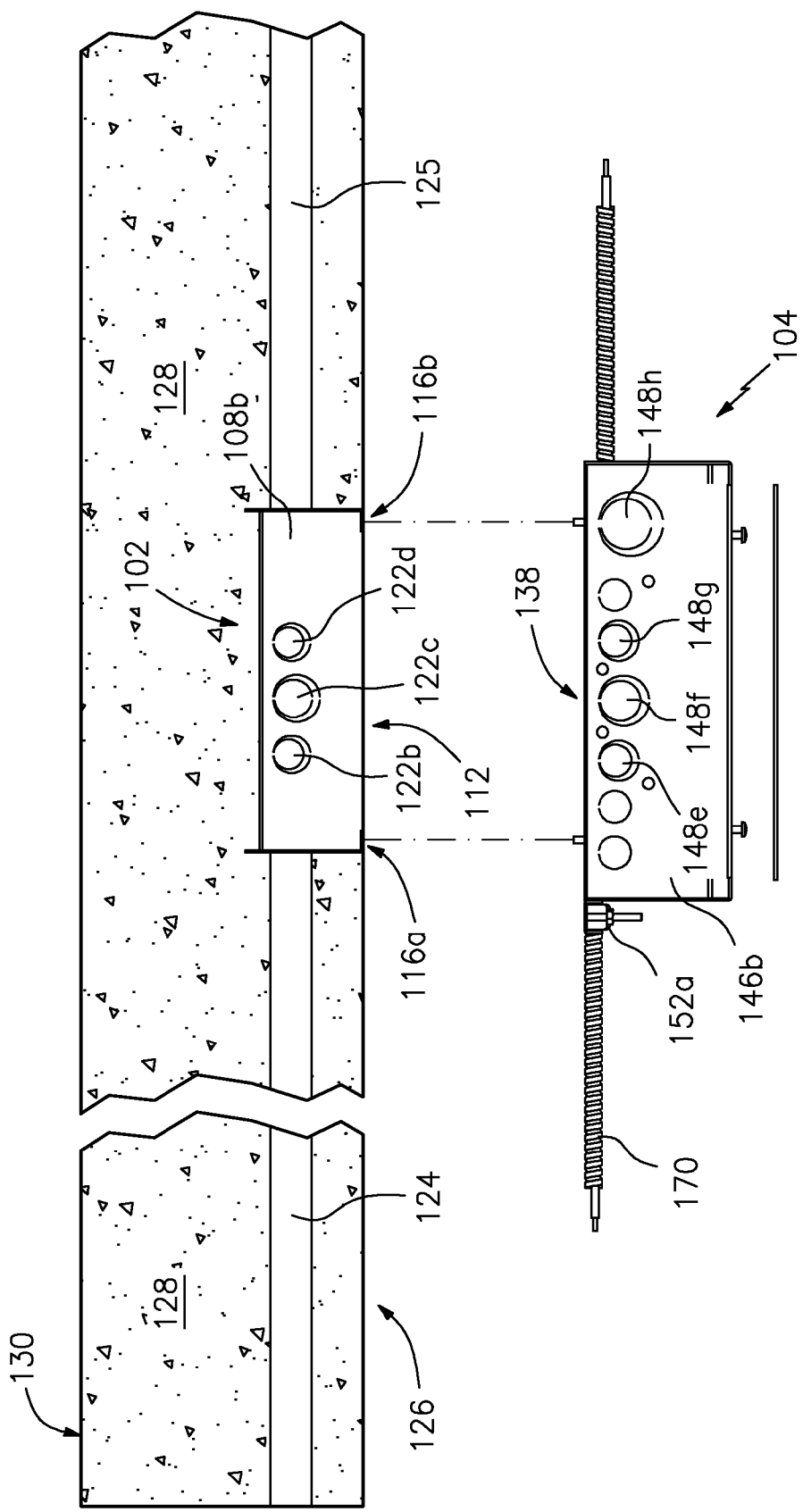
FIG. 9 depicts the lower box about to be lifted and bolted to the embedded upper box.

Upper box 102 has side wall knockouts 122a, 122b, 122c, 122d, 122e, 122f, 122g, 122h for conduit entry of, for example: one conduit 124 entering from any side (e.g., 108a) of box 102 (see FIGS. 1, 2); or, two conduits 124, 125 entering from any opposite sides (e.g., 108a, 108c) of box 102 (see FIG. 9).

Knockouts 122i, 122j are located in the top 106 of upper box 102. They allow for a conduit (not shown) to enter the box 102 from above, if desired or necessary.

Bottom 112 and flanges 116a, 116b are designed to be substantially level with the bottom or bottom plane 126 of a poured deck 128 (see FIGS. 1, 9), when the upper box 102 is embedded in a pour. After the temporary cover 118 is removed, the open bottom 112 and flanges 116a, 116b are exposed (see FIGS. 1-3, 5) through the bottom plane 126 without having to break through concrete of deck 128 and substitute another box. Note also, the conduits 124, 125 do not break though either the top 130 or bottom 126 of the deck 124; they exit at the deck's sides (e.g., 134) (see FIGS. 1-2); in other wards, at room ends.

Figure 7:
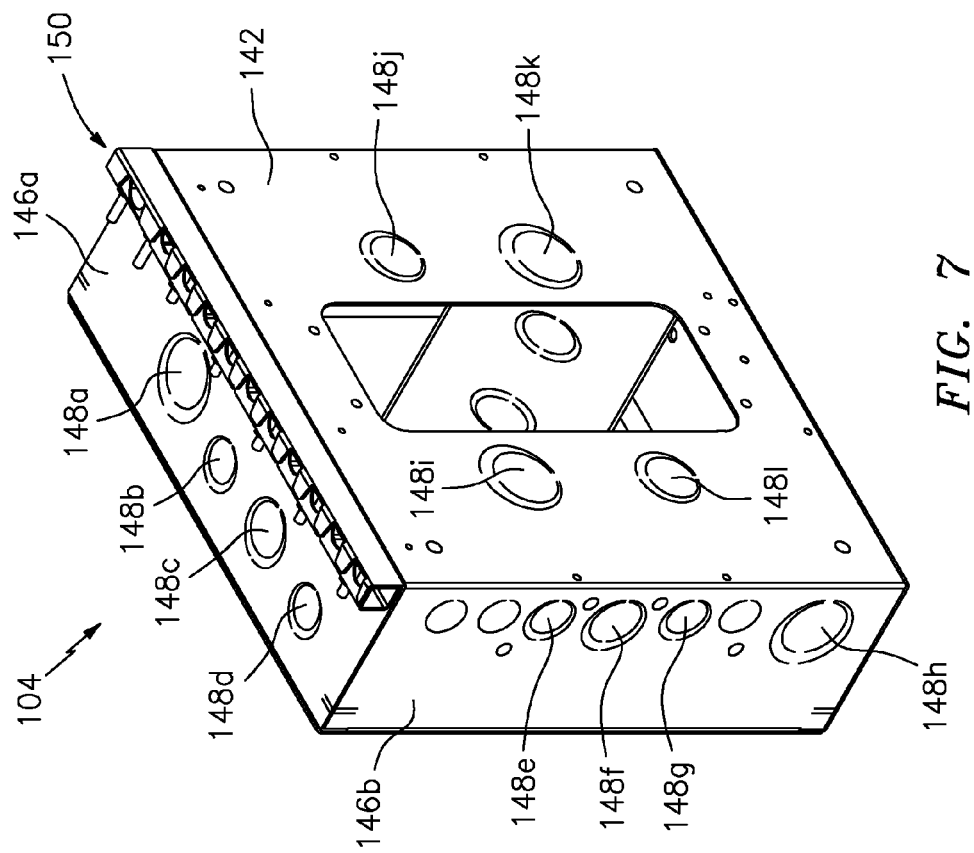
FIG. 7 is a top perspective view looking into the lower box.
Figure 6:
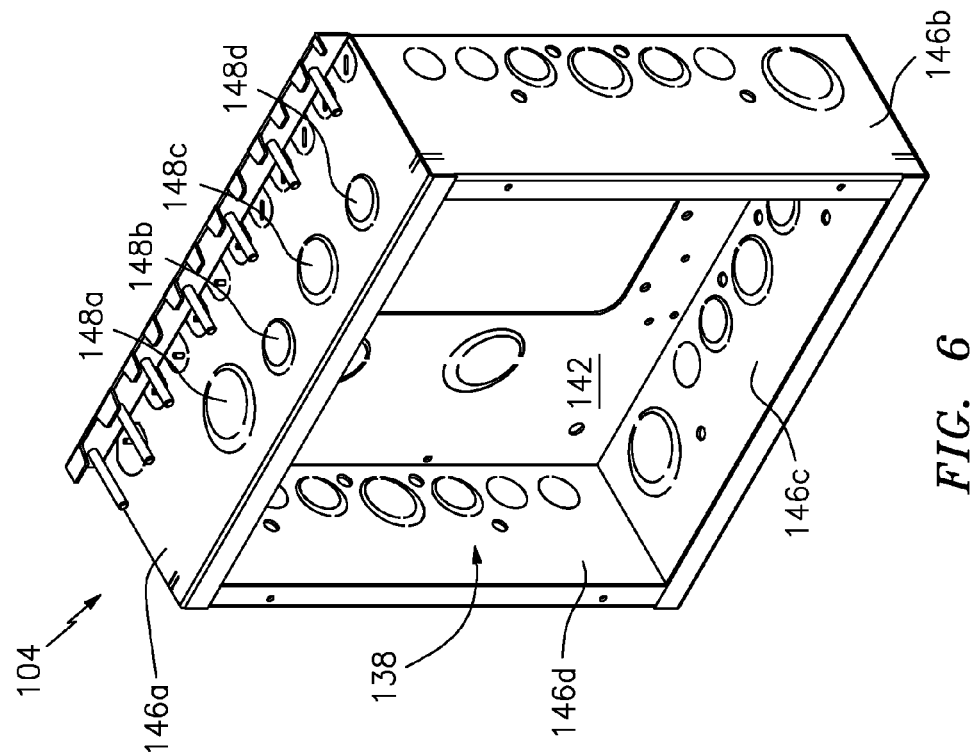
FIG. 6 is a bottom perspective view looking into a preferred lower box.
Figure 8:
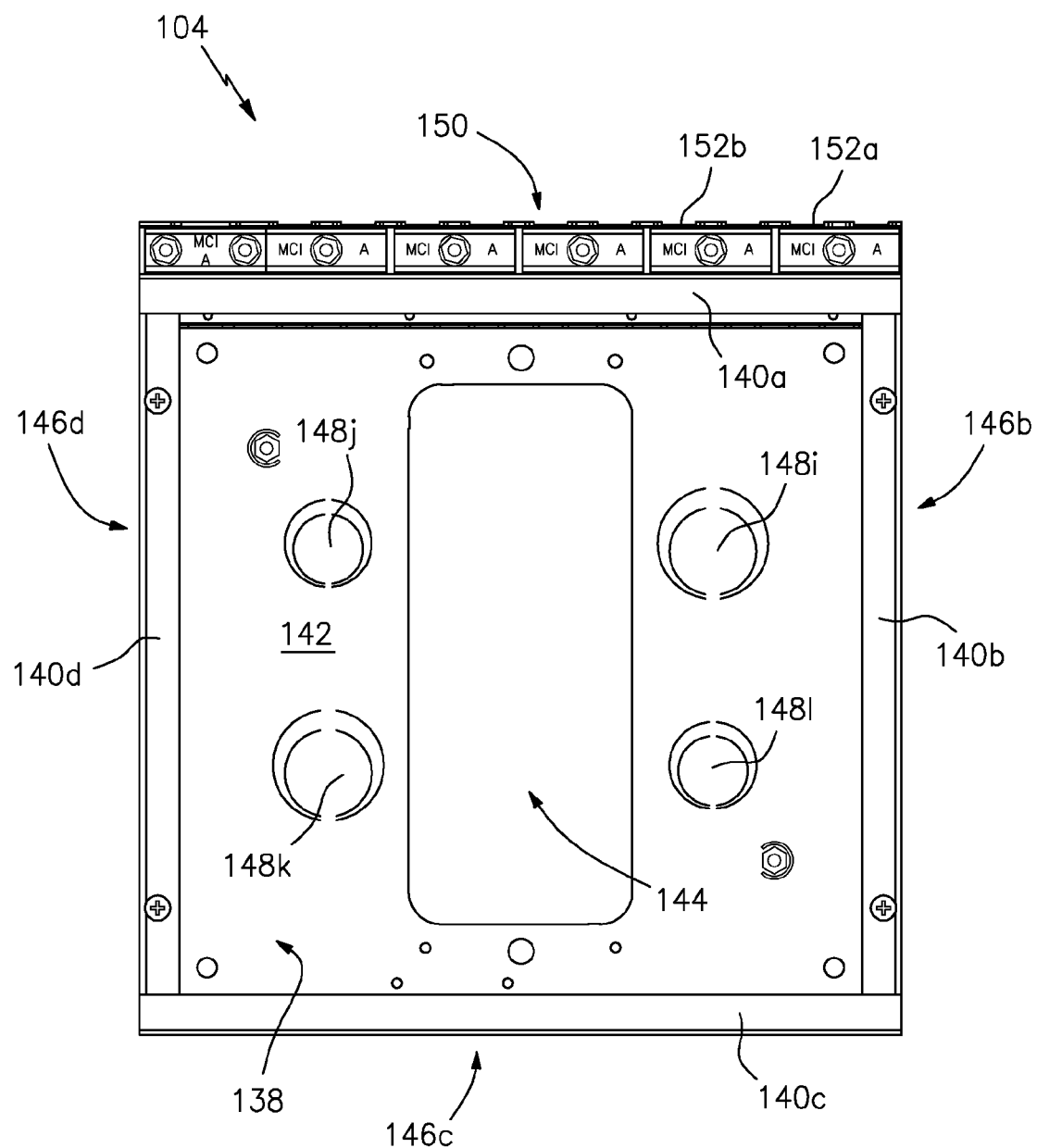
FIG. 8 is a bottom plan view of the lower box.

FIGS. 6, 7, 8 best depict the preferred lower box 104. It is designed to be suspended and exposed below the bottom or plane 126 of the completed deck 128, after being fastened to the upper box 102 (see FIGS. 1-3). Hence, the lower box 104 can be considered a "below-the-deck box", ready to accept surface mounted wiring 170 (see FIG. 9) or wiring pulled through the conduits 124, 125.

Lower box 104 is preferably a rectangular metal box, generally about 6" by 6", up to 24" by 24". It can be larger or smaller, depending upon its use. Box 104 has: an open bottom or backside 138 with flanges 140a, 140b, 140c and 140d framing the opening; and, a top 142 with a smaller, central opening 144. The smaller opening 144 (of lower box 104) is snuggled up against the open bottom 138 (of upper box 102) when the two boxes 102, 104 are joined.

In the illustrated embodiment, the lower box 104 is larger than the upper box 102. Therefore, the lower box 104 has a central opening 144 sized to substantially match the dimensions of open bottom 112 in the upper box 102. Alternatively, the lower box could be smaller, if desired, with a totally open top to match the dimensions of bottom 112. Applicant considers both types to be open tops.

When the illustrated boxes 102, 104 are attached, the open bottom 112 and "contiguous" open top 142 combine to provide a passage between the boxes. The central opening 144 (in box 104) matches with open bottom 112 (in box 102) to form that passage.

The preferred lower box 104 also has: side walls 146a, 146b, 146c, 146d with knockouts such as 148a, 148b, 148c, 148d, 148e, 148f, 148g, 148h (see FIGS. 6, 7), and knockouts 148i, 148j, 148k, 148l, in top 142.

Box 104 also has, preferably, a row 150 of clamps (e.g., 152a, 152b), such as the clamps described in Applicant's U.S. Pat. No. 6,979,779. It also has an optional cover 153 (see FIG. 12) preferably screwed into flanges 140a, 140b, though clips (not shown) or a hinge device (not shown) would suffice. While the cover 153 is optional, it typically is not needed in the assembled box 100. Access is easier without it.

Lower box 104 is similar to the electrical junction box disclosed in Applicant's U.S. Pat. No. 6,979,779, issued Dec. 27, 2005. Applicant hereby incorporates that patent by reference.

Figure 10:
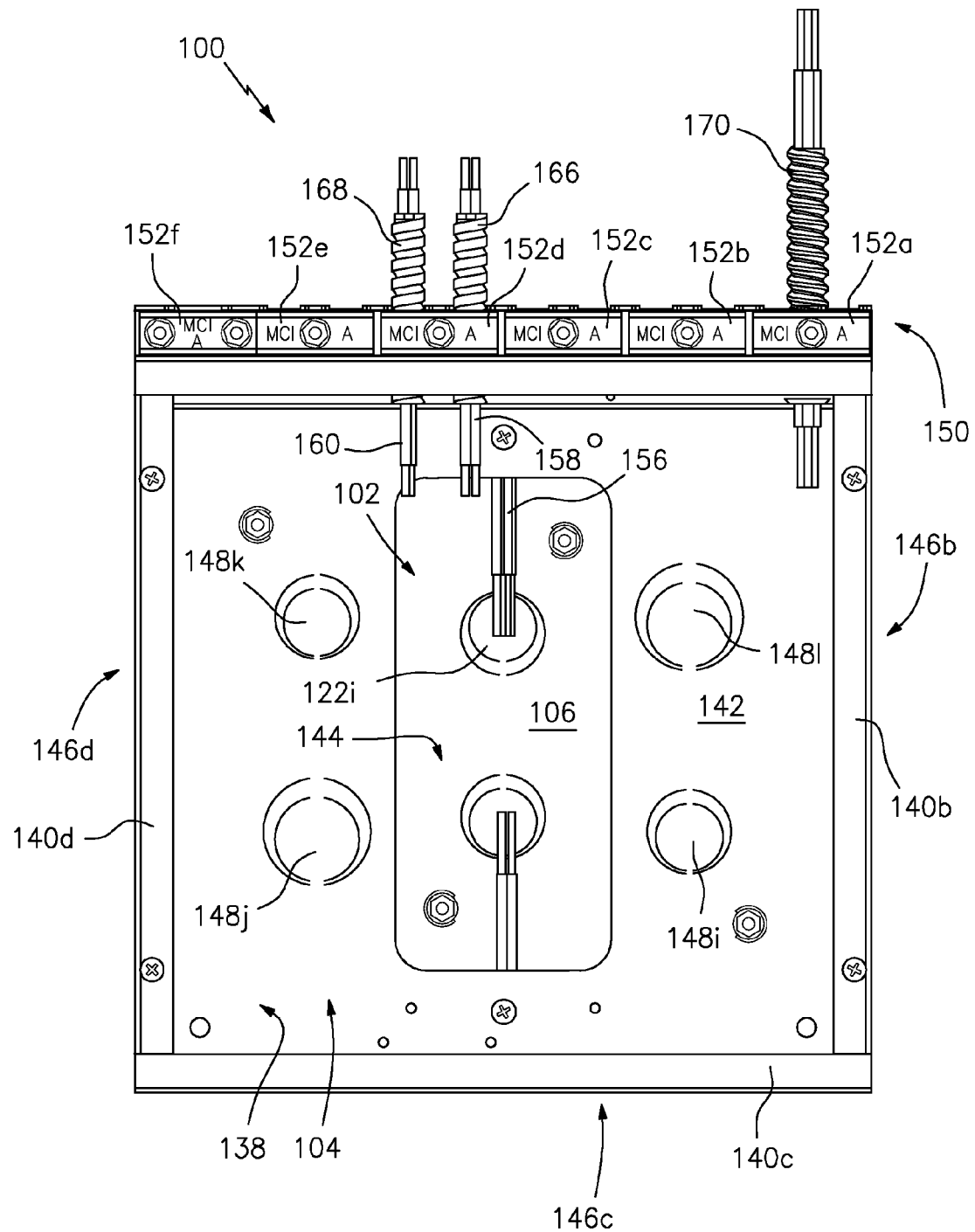
FIG. 10 is a view looking upward into the electrical junction box, as installed under a concrete deck, minus the deck.
Figure 12:
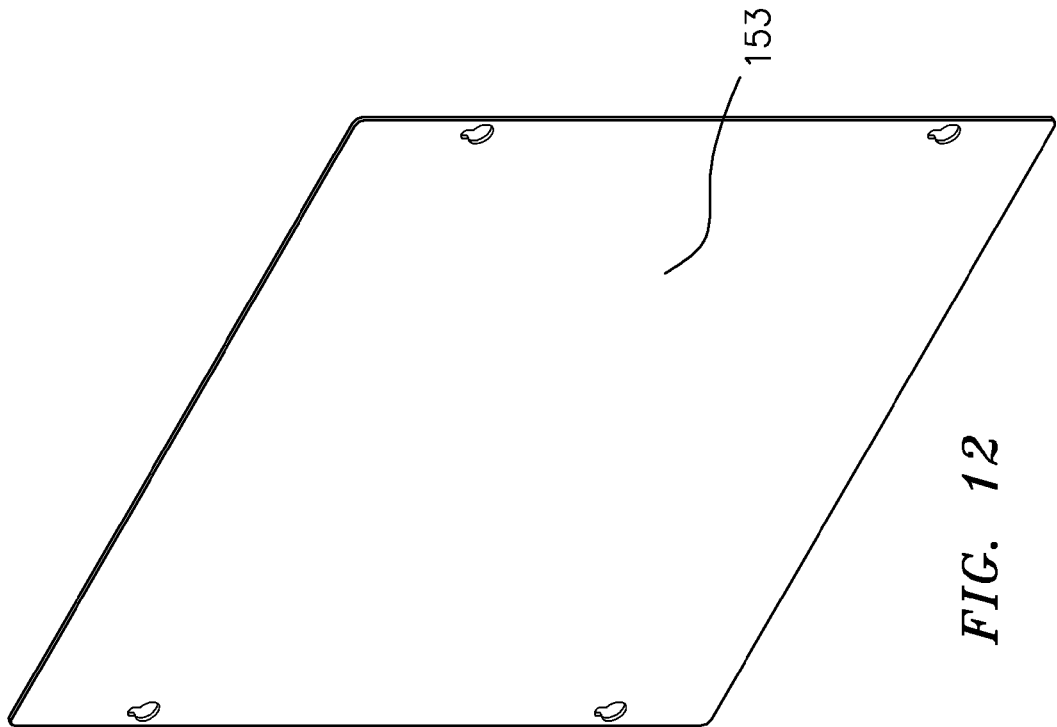
FIG. 12 is a perspective view of an optional cover for the lower box.

FIG. 10 is a view looking up at the bottom of the poured deck (not shown in FIG. 10) after boxes 102, 104 are fastened together, minus the poured deck. Wires 154, 156 from conduits 124, 125 are shown ready to be spliced to wires (e.g., 158, 160), pulled into lower box 104, of standard cables (e.g., 166, 168). The cables are held in place by clamp 152d.

Depicted metal clad ("MC") cable 170 is clamped by clamp 152a. See FIGS. 9, 10.

Figure 1:
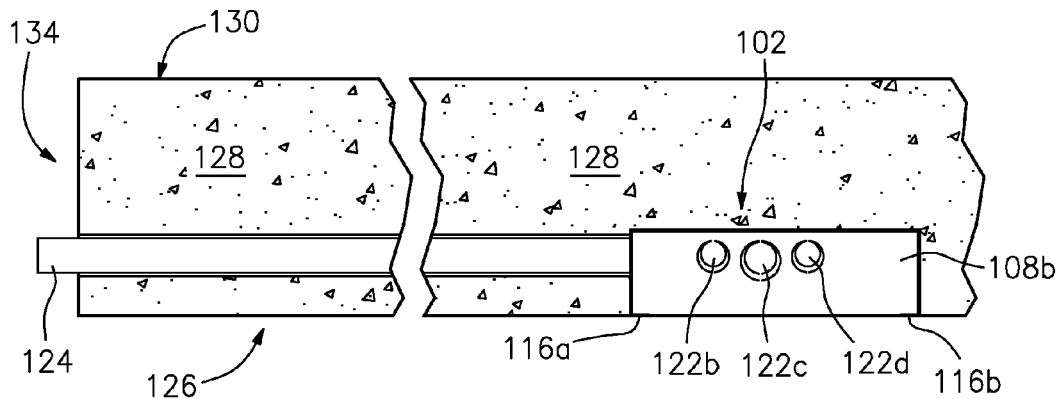
FIG. 1 depicts an upper box of Applicant's preferred embodiment, with an associated conduit, embedded in concrete at pour.

FIGS. 1, 2, 9 best depict the preferred installation process, in embedded concrete, for Applicant's assembled electrical junction box 100. That process can be broadly thought of as follows:

a. pouring a concrete deck;
b. embedding a first box, at least partially, into the deck during the pouring, wherein:
   i. the first box has an open bottom which is exposed and accessible after the pouring is completed and without breaking through the concrete deck;
   ii. the first box has at least one conduit entry;
c. lifting a second box, with an open top (e.g., a top with a central opening), towards the open bottom of the embedded first box;
d. fastening the first and second boxes together to form an assembled electrical junction box, wherein:
   i. the second box is substantially below the bottom of the deck and exposed to accept both surface mount wiring and wiring pulled through the at least one conduit; and
e. pulling wire through the at least one conduit and splicing it to other wiring in the electrical junction box.

In addition, a narrower version of the preferred method can include the following steps:

a. wherein the attached second box has:
   i. side walls below the deck with knockouts;
   ii. external cable clamps extending from at least one side wall;
   iii. bottom walls with knockouts; and
   iv. a central opening extending through the top of the attached box.
b. connecting a conduit to the first box prior to pouring the deck;
c. embedding the conduit into the deck during the pouring, whereby:
   i. the conduit does not break through the bottom of the deck;
   ii. the conduit does not break through the top of the deck;
   iii. the conduit extends through a side of the deck;
d. attaching a cover to the first box, prior to the pouring, to cover the open bottom and thereby prevent poured concrete from entering the first box; and e. removing the cover after the pouring is completed to expose the open bottom.

Figure 11:
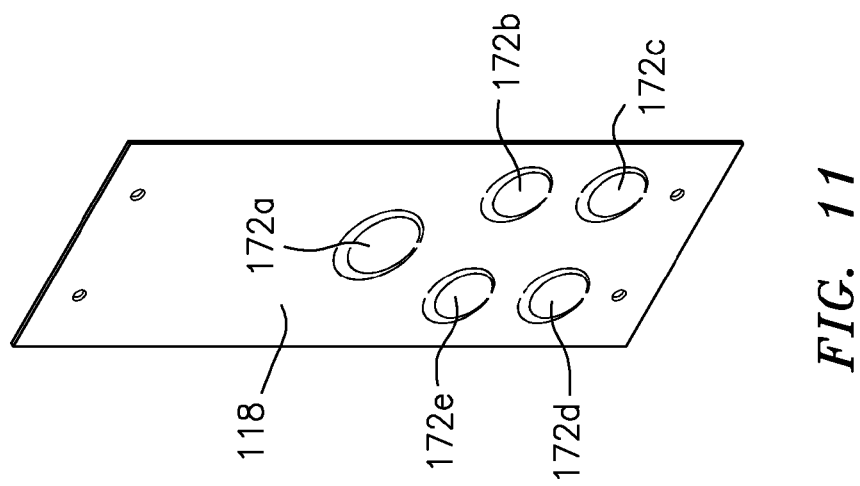
FIG. 11 is a perspective view of a removable cover for the upper box.

As shown in FIG. 11, cover 118 has knockouts 172a, 172b, 172c, 172d, 172e. That way, the cover 118 can be used to cover the upper box 102, if no larger box (e.g., lower box 104) is fitted over it. While that is not Applicant's preferred apparatus, it is an alternate embodiment. In that instance, the cover 118 and upper box 102 form a closed electrical junction box.

The installation process for the alternate embodiment comprises:
  a. pouring a concrete deck;
  b. embedding an electrical junction box at least partially into that deck during the pouring, wherein:
    i. the junction box has an open bottom which is exposed through a bottom of the deck, after the pouring is completed and without breaking through the concrete deck;
    ii. the junction box has at least one conduit entry;
  c. prior to the pouring, attaching a cover to the box to cover the open bottom and thereby prevent poured concrete from entering the junction box; and
  d. removing the cover after the pouring is completed to expose the open bottom.

In addition, this alternate method can include the following narrower steps:
  a. connecting a conduit to the junction box prior to pouring the deck;
  b. embedding the conduit into the deck during the pouring, whereby:
    i. the conduit does not break through the bottom of the deck;
    ii. the conduit does not break through the top of the deck;
    ii. the conduit extends through a side of the deck;
  c. pulling wires through the at least one conduit and into the junction box; and
  d. reattaching the cover to the junction box.

It should be understood by those skilled in the art that obvious structural modifications can be made, beyond those noted above, without departing from the spirit of the invention. For example, the upper box can be positioned, during the pour, so as to extend slightly beyond the bottom of the deck. In addition, although the invention has been disclosed as being used with concrete (i.e., portland cement), it could be used instead with other cement in some applications. Accordingly, reference should be made primarily to the accompanying claims, rather than the foregoing description, to determine the scope of the invention.

I claim:

1. A method of installing wiring in poured concrete comprising:
  a. pouring a concrete deck;
  b. embedding a first box, which is part of an electrical junction box, into that deck during the pouring, wherein:
    i. the first box has an open bottom which is substantially level with and exposed through a bottom of the deck, after the pouring is completed and without breaking through the concrete deck;
    ii. the first box has at least one conduit entry;
  c. lifting a second box, with an open top, towards the bottom opening of the embedded first box;
  d. fastening the first box and the second box together to form a completed electrical junction box, wherein:
    i. the second box is substantially below the bottom of the deck and exposed to accept surface mount wiring and wiring pulled from the conduit entry.

2. The method of claim 1 further comprising:
  a. prior to the pouring, attaching a cover to the first box to cover the open bottom and thereby prevent poured concrete from entering the first box; and
  b. removing the cover after the pouring is completed to expose the open bottom.

3. The method of claim 2 further comprising:
  a. connecting a conduit to the first box prior to pouring the deck;
  b. embedding the conduit into the deck during the pouring, whereby:
    i. the conduit does not break through the bottom of the deck;
    ii. the conduit does not break through the top of the deck;
    iii. the conduit extends through a side of the deck.

4. The method of claim 1 wherein the open bottom and open top form a passage between the first and second box.

5. The method of claim 4 further comprising:
  a. pulling wires through the at least one conduit entry and into the completed electrical junction box.

6. The method of claim 5 further comprising:
  a. splicing the wires, pulled from the conduit, with other wires pulled into the completed electrical junction box.

7. A method comprising:
  a. pouring a concrete deck;
  b. embedding a first box, at least partially, into that deck during the pouring, wherein:
    i. the first box has an open bottom which is exposed and accessible after the pouring is completed and without breaking away concrete from the deck;
    ii. the first box has at least one conduit entry;
  c. lifting a second box, with a top opening, towards the open bottom of the embedded first box;
  d. fastening the first box and the second box together to form a completed electrical junction box, wherein:
    i. the second box is substantially below the bottom of the deck and exposed to accept both surface mount wiring and exposed wiring.

8. The method of claim 7 further comprising:
  a. attaching a conduit to the first box prior to pouring the deck;
  b. embedding the conduit into the deck during the pour, whereby:
    i. the conduit does not break through the bottom of the deck;
    ii. the conduit does not break through the top of the deck;
    iii. the conduit extends through a side of the deck.

9. The method of claim 7, wherein the second box comprises:
  a. side walls below the deck with knockouts;
  b. external cable clamps extending from at least one side wall;
  c. bottom walls with knockouts; and
  d. a central opening extending through the bottom of the second box.

* * * * *